(12) United States Patent
Field

(10) Patent No.: US 9,234,334 B2
(45) Date of Patent: Jan. 12, 2016

(54) PRESSURE TANK

(76) Inventor: George Raymond Field, Edmonton (CA)

(*) Notice: Subject to any disclaimer, the term of this patent is extended or adjusted under 35 U.S.C. 154(b) by 1569 days.

(21) Appl. No.: 12/654,273

(22) Filed: Dec. 16, 2009

(65) Prior Publication Data

US 2011/0139711 A1 Jun. 16, 2011

(51) Int. Cl.
*B65D 1/32* (2006.01)
*E03B 11/02* (2006.01)
*E03B 5/00* (2006.01)
*B01D 21/02* (2006.01)
*C02F 1/00* (2006.01)

(52) U.S. Cl.
CPC . *E03B 11/02* (2013.01); *E03B 5/00* (2013.01); *B01D 21/02* (2013.01); *C02F 2001/007* (2013.01)

(58) Field of Classification Search
USPC ......... 220/723, 720, 721, 530, 560.08, 560.1, 220/567.2, 567.3; 210/519; 114/74 A; 62/45.1, 48.3, 52.1, 315
See application file for complete search history.

(56) References Cited

U.S. PATENT DOCUMENTS

| | | | | |
|---|---|---|---|---|
| 3,626,672 | A | * | 12/1971 | Burbidge ........................ 96/181 |
| 3,662,929 | A | * | 5/1972 | Sims .......................... 222/386.5 |
| 3,809,291 | A | * | 5/1974 | Purdy ......................... 222/145.1 |
| 4,784,181 | A | * | 11/1988 | Hilverdink ...................... 138/30 |
| 5,349,829 | A | * | 9/1994 | Tsimerman ...................... 62/314 |
| 2007/0102433 | A1 | * | 5/2007 | Allidieres et al. ....... 220/560.11 |

* cited by examiner

*Primary Examiner* — Jeffrey Allen
(74) *Attorney, Agent, or Firm* — George A. Seaby

(57) ABSTRACT

A pressure tank assembly for use primarily in a plumbing system connected to a well or other water supply system includes a tank containing a bladder and a ring around the bladder in the tank midway between the top and bottom ends thereof. Water is introduced into the ring and discharged into the tank via holes in the bottom of the ring. Water for domestic use is drawn from the top of the tank. Sediment is removed through a drain in the bottom of the tank.

6 Claims, 3 Drawing Sheets

PRESSURE TANK

FIELD OF THE INVENTION

This invention relates to a pressure tank. More specifically, the invention relates to a pressure tank for use in a plumbing system which includes a pump for pumping water from a well or a body of water such as a lake, dug out, cistern or a river.

DESCRIPTION OF RELATED ART

Pressure tanks are by no means new. With conventional pressure tanks presently available in the marketplace, water is introduced through an inlet pipe (supply line) and a tee joint at the bottom of the tank and also discharged through an outlet in the bottom of the tank to a service line. A drain cock in the bottom of the tank for feeding water to the service line is of little value other than as an auxiliary supply line. Discharging water through the bottom of the tank results in the discharge of some of the sand in the water into the drain line. Thus, mainly sand and solids that originate in the system's water supply are carried out of a tank to a faucet, sometimes necessitating the use of at least one fitter. Sediments in the water source, some of which accumulate in the tank, are constantly flushed out of the tank passing through the service line and faucets connected thereto. However, most of the sediments from the water source are carried through the pump, the supply line, the pressure tank and the service line causing problems in the complete plumbing system.

Pressure tanks are available with or without interior bladders. The advantage of a bladder is that the tank cannot become water logged. In a pressure tank without a bladder, water and air are in direct contact and over time air is absorbed by the water. The tank becomes water logged when it contains insufficient air, and the pump will go on and off more often than necessary, causing inconsistent pressure and unnecessary starting and stopping of the supply pump. Recharging of the tank becomes necessary. With a tank containing a bladder, there is no air-water contact, and recharging should never be necessary unless the bladder is ruptured.

BRIEF SUMMARY OF THE INVENTION

The present invention provides a solution to the above-identified problems in the form of a pressure tank, which virtually eliminates the amount of sediment discharged from the tank into the service line.

According to one aspect the invention relates to a pressure tank assembly including a tank having a side wall, a top wall and a bottom wall; an inlet in the tank for introducing water into the tank; a tubular ring in the tank midway between said top and bottom walls for receiving water from said inlet; a plurality of outlet orifices in the bottom of said ring for discharging water into the tank; a first outlet in the top wall of the tank for discharging water from the tank for use; an expansible bladder in the tank; a valve in the bladder extending out of said top wall for admitting or discharging air from said bladder; a second outlet in the bottom wall of the tank for discharging sediment from the tank; and a cage above said second outlet connected to a bottom end of said bladder for maintaining the bladder in a fixed position above the bottom wall and permitting the escape of water-borne sediment from the tank via said second outlet.

BRIEF DESCRIPTION OF THE DRAWINGS

The invention is described below in greater detail with reference to the accompanying drawings which illustrate preferred embodiments of the invention, and wherein:

When describing the second embodiment of the invention (FIGS. 3 and 4), wherever possible the same reference numerals have been used to identify elements similar to or the same as elements in the embodiment of FIGS. 1 and 2.

With reference to FIGS. 1 and 2, a pressure tank assembly in accordance with the present invention includes a hollow, cylindrical tank 1 with generally hemispherical top and bottom ends 2 and 3, respectively. The tank 1 is preferably formed of fiberglass, but can be produced using other materials. The tank 1 is usually mounted on a stand 4 but can be otherwise supported in a use position.

Figure 1:
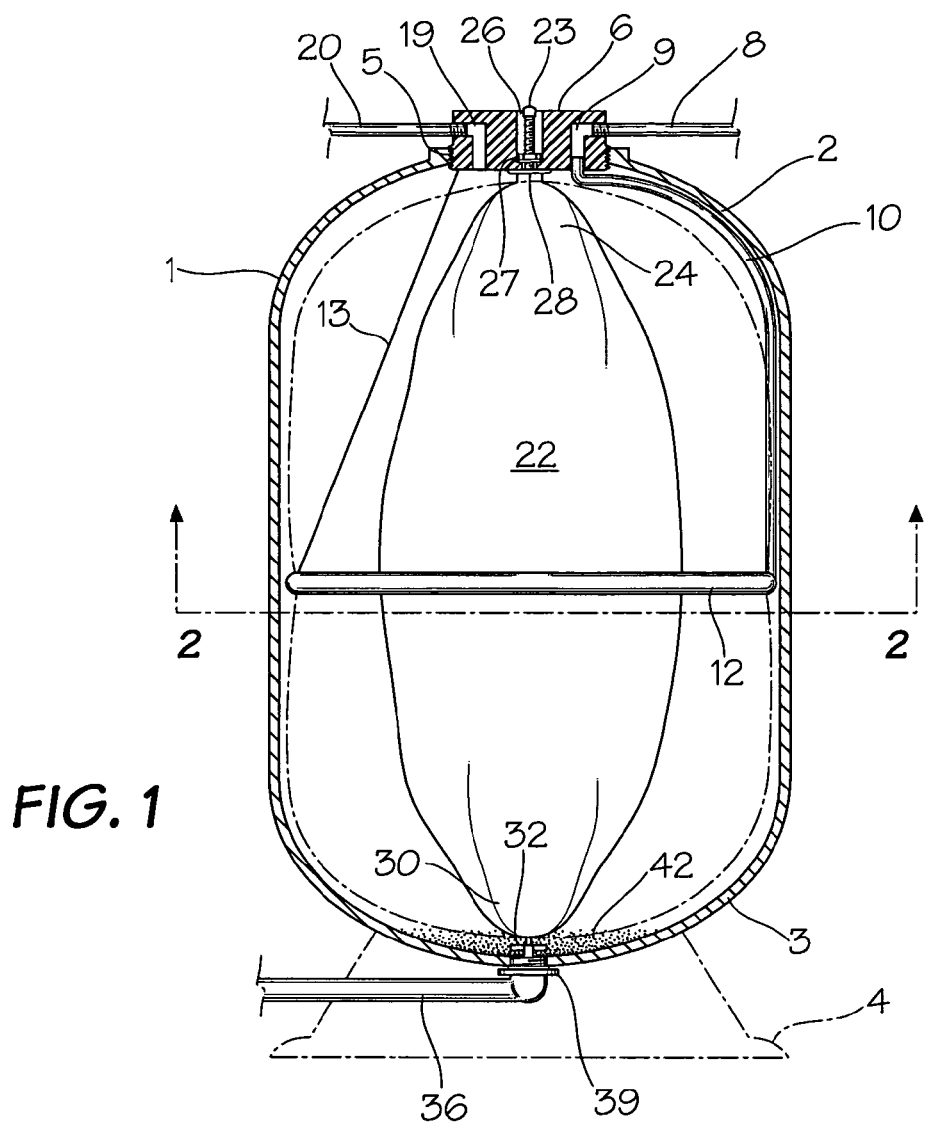
FIG. 1 is a longitudinal sectional view of one embodiment of a pressure tank assembly in accordance with the present invention.
Figure 2:
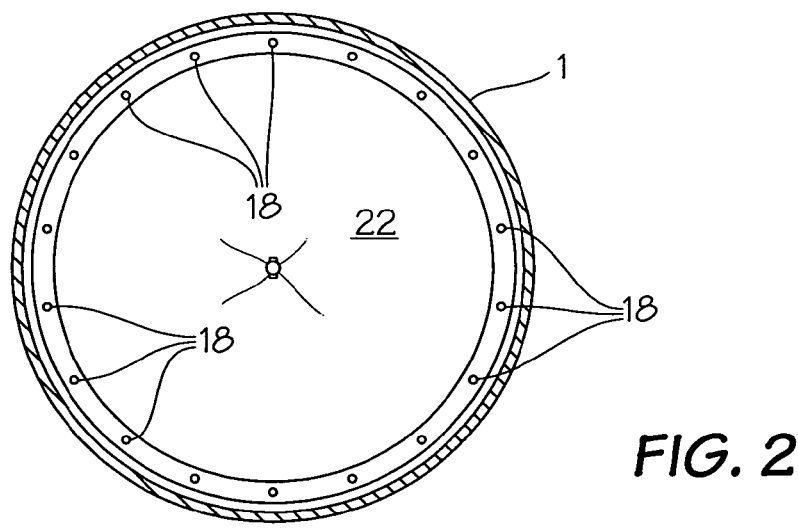
FIG. 2 is a cross-sectional view of the pressure tank assembly of FIG. 1 taken generally along line 2-2 of FIG. 1.

A threaded opening 5 in the top end 2 of the tank 1 receives the externally threaded bottom end of a manifold 6. A water inlet pipe 8 is connected to one side of the manifold 6 for introducing water via a passage 9 into the tank 1. Water flowing through the passage 9 enters an inlet tube 10, which extends along the inner top end 2 and one side of the body 1 to a tubular ring 12 proximate the middle of the tank.

Figure 3:
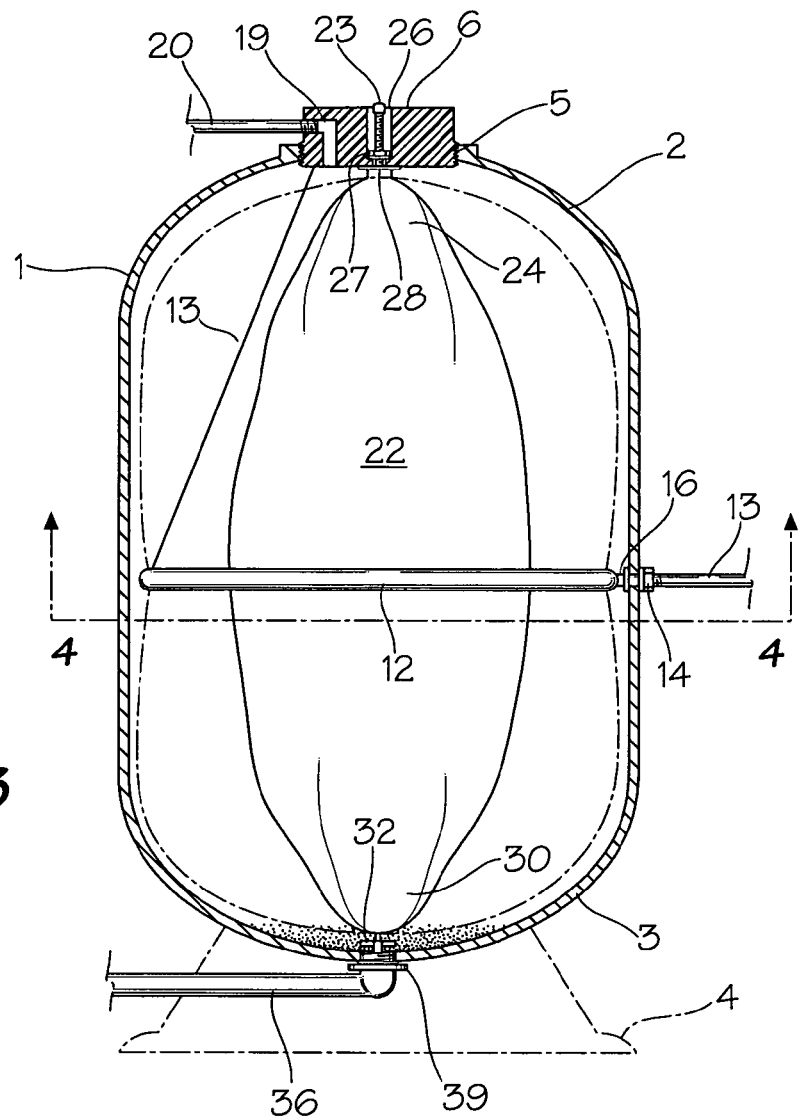
FIG. 3 is a longitudinal sectional view of a second embodiment of the pressure tank assembly.
Figure 4:
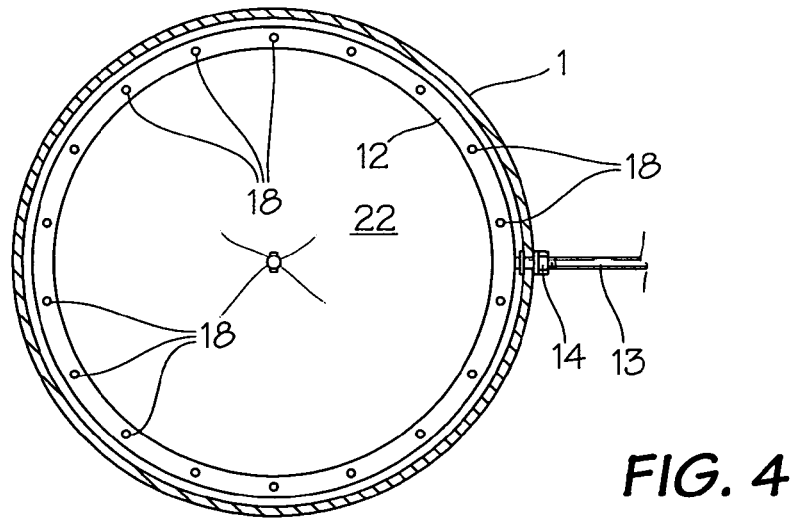
FIG. 4 is a cross-sectional view of the pressure tank assembly of FIG. 3 taken generally along line 4-4 of FIG. 3; and, FIG. 5 is an exploded view of the bottom end of a bladder and a drain assembly used in the pressure tank assemblies of FIGS. 1 to 4.

In a second embodiment of the invention (FIGS. 3 and 4) the water enters the tank 1 via an inlet pipe 13, a fitting 14 in the side of the tank and a tube 16 connected to the ring 12. The ring 12 is supported in the body 1 by the tube 10 (FIG. 1) or 16 (FIG. 3) and a chain or wire 17 extending between the bottom of the manifold 6 and a side of the ring 12 opposite the bottom end of the tube 10 (FIG. 1) on the inner end of the tube 16 (FIGS. 3 and 4). Water is discharged into the tank 1 via a plurality of holes 18 in the bottom of the ring 12. Water for use in a dwelling or other building is discharged from the tank 1 via a second passage 19 in the manifold 6 and an outlet pipe 20.

An expansible bladder 22 is mounted in the center of the body 1. A valve 23 at the top end 24 of the bladder 22 extends into a stepped hole 26 in the center of the manifold 6. The threaded stem of the valve 23 receives a nut 27 for tightening a washer 28 carrying the valve on the bladder 23 against the bottom of the manifold 6.

Figure 5:
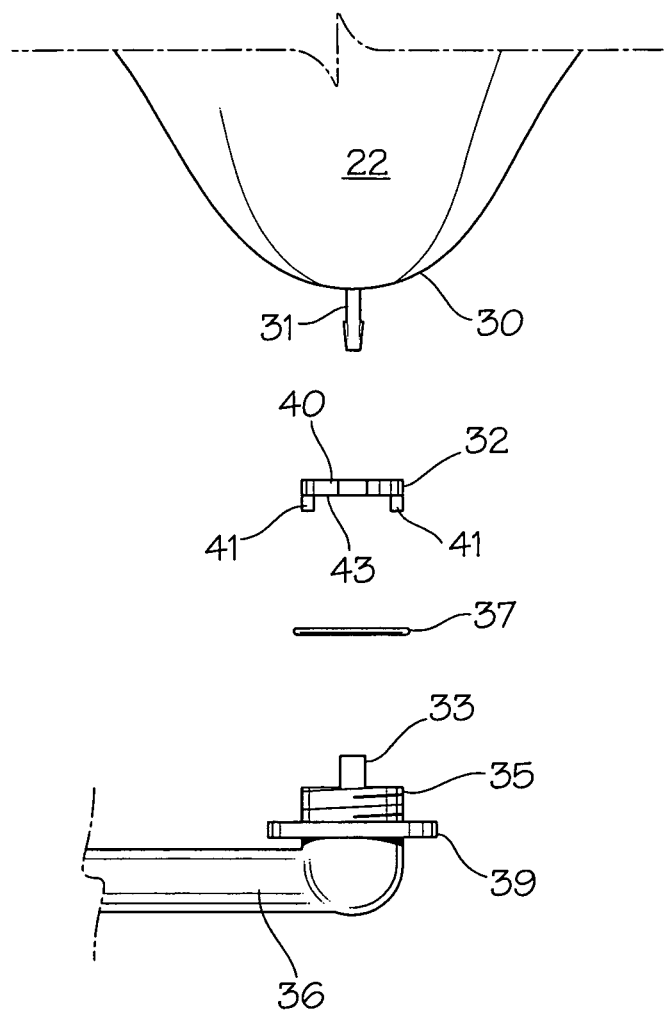

As best shown in FIG. 5, the bottom end 30 of the bladder 22 carries a stem 31, which extends downwardly through a cage 32 into a tubular post 33, which extends upwardly from the center of the open top end 35 of a drain pipe 36. The top end 35 of the pipe 36 is threaded for connecting the pipe to the tank 1. An O-ring 37 between an annular flange 39 on the pipe 36 and the bottom of the tank 1 seals the pipe with respect to the tank. The cage 32 includes a disc-shaped top 40 and legs 41 for supporting the top 40 above the bottom of the tank 1. Water and sediment 42 can escape from the bottom of the tank 1 via gaps 43 between the legs 41.

In operation, the bladder 22 is inflated to the desired pressure, which is preferably 5-20 psi. The tank 1 is filled with water via the inlet pipe 8 or 13, the tube 10 or 16 and the ring 12. The pump can be operated until the pressure in the tank 1 is at a sensible operating pressure such as 30 to 50 psi or lower or higher.

Because water entering the tank 1 is discharged downwardly from the ring 12, solid particles in the water are started downwardly immediately upon exiting the ring. By locating the ring 12 midway between the top and bottom walls of the tank 1 and including a plurality of holes in the ring, the water exiting the ring does not disturb any sediment in the bottom of the tank. The velocity of water in the annulus between the tank 1 and the bladder 22 is so much lower than the velocity of the water entering the tank via the inlet 8 or 13 and exiting at the outlet 20 that virtually no solids can rise to the top of the tank. When the pump is not operating and water is not being withdrawn from the tank 1, further settling of solids occurs. From time to time, a valve (not shown) in the drain pipe 36 is opened to remove sediment 42. Thus, solids in water from the tank 1 are substantially or completely removed before the water is discharged from the tank from the top thereof. Obviously, solids that remain suspended in water will not settle to the bottom of the tank.

The invention claimed is:

1. A pressure tank assembly including a tank having a side wall, a top wall and a bottom wall; an expansible bladder in the tank; a valve in the bladder extending out of said top wall for admitting or discharging air from said bladder; an inlet in the tank for introducing water into the tank; a tubular ring in the tank midway between said top and bottom walls and extending around the bladder for receiving water from said inlet, a plurality of outlet orifices in the bottom of said ring for discharging water into the tank; a first outlet in the top wall of the tank for discharging water from the tank for use; a second outlet in the bottom wall of the tank for discharging sediment from the tank; and a cage above said second outlet connected to a bottom end of said bladder for maintaining the bladder in a fixed position above the bottom wall and permitting the escape of water-borne sediment from the tank via said second outlet.

2. The pressure tank assembly of claim 1 including a manifold in said top wall of the tank, said manifold containing said inlet, said first outlet and said valve.

3. The pressure tank assembly of claim 2, wherein said side wall of the tank is cylindrical, and the top and bottom walls are hemispherical, and said inlet extends from said manifold and along the interior of said top and side walls to one side of said ring.

4. The pressure tank assembly of claim 1, wherein the side wall of the tank is cylindrical, and the top and bottom walls are hemispherical, and said inlet extends through said side wall to one side of said ring.

5. The pressure tank of claim 3 including a non-corrosive wire or chain connected to said manifold and to a second side of said ring opposite said one side for maintaining said ring in a horizontal position in the tank.

6. The pressure tank of claim 4 including a non-corrosive wire or chain connected to said manifold an to a second side of said ring opposite said one side for maintaining said ring in a horizontal position.

* * * * *